United States Patent
Lee et al.

(10) Patent No.: US 12,148,882 B2
(45) Date of Patent: Nov. 19, 2024

(54) METHOD FOR FABRICATING ALL-SOLID-STATE BATTERY INCLUDING BINDING ELECTRODE PORTIONS HAVING ELECTROLYTE SLURRY LAYER TOGETHER

(71) Applicant: LG Chem, Ltd., Seoul (KR)

(72) Inventors: Suk-Woo Lee, Daejeon (KR); Eun-Bee Kim, Daejeon (KR); Ji-Hoon Ryu, Daejeon (KR); Jung-Pil Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 367 days.

(21) Appl. No.: 17/283,414

(22) PCT Filed: Oct. 15, 2019

(86) PCT No.: PCT/KR2019/013534
§ 371 (c)(1),
(2) Date: Apr. 7, 2021

(87) PCT Pub. No.: WO2020/080805
PCT Pub. Date: Apr. 23, 2020

(65) Prior Publication Data
US 2021/0344044 A1    Nov. 4, 2021

(30) Foreign Application Priority Data
Oct. 15, 2018    (KR) .......................... 10-2018-0122824

(51) Int. Cl.
*H01M 10/0565*    (2010.01)
*H01M 10/058*    (2010.01)

(52) U.S. Cl.
CPC ..... *H01M 10/0565* (2013.01); *H01M 10/058* (2013.01); *H01M 2300/0082* (2013.01)

(58) Field of Classification Search
CPC ...................... H01M 10/0565; H01M 10/058
(Continued)

(56) References Cited

U.S. PATENT DOCUMENTS 7,097,941 B1    8/2006  Hatazawa et al.
2001/0016290 A1    8/2001  Kezuka
(Continued)

FOREIGN PATENT DOCUMENTS

JP    08222235 A  *  8/1996
JP    2002208435 A    7/2002
(Continued)

OTHER PUBLICATIONS

International Search Report for Application No. PCT/KR2019/013534 dated Jan. 14, 2020, pp. 1-3.

*Primary Examiner* — Sean P Cullen
(74) *Attorney, Agent, or Firm* — Lerner David LLP

(57) ABSTRACT

The present disclosure relates to a method for manufacturing a solid-state battery, wherein slurry for a solid electrolyte layer is applied to each of the electrodes, and the electrodes are bound to each other before drying to obtain a solid-state battery. In the solid-state battery, each electrode is in close contact with the solid electrolyte membrane to provide excellent interfacial property, such as reduced resistance. In addition, the thickness of the solid electrolyte membrane may be controlled to a level of several microns to provide an effect of increasing the energy density of a unit cell.

11 Claims, 5 Drawing Sheets

(58) Field of Classification Search
USPC .............................. 429/188; 29/623.4, 623.5
See application file for complete search history.

(56) References Cited

U.S. PATENT DOCUMENTS

| | | | | |
|---|---|---|---|---|
| 2003/0180623 A1* | 9/2003 | Yun | .................... | H01M 10/0565 |
| | | | | 429/316 |
| 2004/0106046 A1* | 6/2004 | Inda | ................. | H01M 10/0562 |
| | | | | 29/623.5 |
| 2008/0241665 A1* | 10/2008 | Sano | ................. | H01M 10/0525 |
| | | | | 429/149 |
| 2012/0049126 A1* | 3/2012 | Park | .................... | H01M 4/5825 |
| | | | | 252/182.1 |
| 2012/0110835 A1* | 5/2012 | Hudson | ............. | H01M 10/0565 |
| | | | | 427/77 |
| 2013/0260280 A1 | 10/2013 | Hiraiwa et al. | | |
| 2017/0092988 A1 | 3/2017 | Haga et al. | | |
| 2017/0222278 A1 | 8/2017 | Kwon et al. | | |

FOREIGN PATENT DOCUMENTS

| | | | | | |
|---|---|---|---|---|---|
| JP | 4355970 | B2 | | 11/2009 | |
| JP | 2012115775 | A | | 6/2012 | |
| JP | 2015002080 | A | * | 1/2015 | |
| JP | 2015008073 | A | | 1/2015 | |
| JP | 2017062939 | A | | 3/2017 | |
| KR | 100613800 | B1 | | 8/2006 | |
| KR | 2015061538 | A | * | 6/2015 | ............. H01G 11/56 |
| KR | 20150061538 | A | | 6/2015 | |
| KR | 20160051660 | A | | 5/2016 | |
| KR | 2018046574 | A | * | 5/2018 | ........ H01M 10/0468 |
| KR | 20180046574 | A | | 5/2018 | |
| KR | 20180076709 | A | | 7/2018 | |

* cited by examiner

METHOD FOR FABRICATING ALL-SOLID-STATE BATTERY INCLUDING BINDING ELECTRODE PORTIONS HAVING ELECTROLYTE SLURRY LAYER TOGETHER

CROSS-REFERENCE TO RELATED APPLICATION(S)

This present application is a national phase entry under 35 U.S.C. § 371 of International Application No. PCT/KR2019/013534 filed Oct. 15, 2019, which claims priority from Korean Patent Application No. 10-2018-0122824 filed Oct. 15, 2018, all of which are incorporated herein by reference in their entirety.

TECHNICAL FIELD

The present disclosure relates to a method for manufacturing a solid-state battery including a solid electrolyte.

BACKGROUND ART

A lithium ion battery using a liquid electrolyte has a structure in which a negative electrode and positive electrode are divided by a separator, and thus may cause a short-circuit when the separator is damaged by deformation or external impact, resulting in a risk, such as overheating or explosion. Therefore, it can be said that development of a solid electrolyte capable of ensuring safety is a very important problem in the field of lithium ion secondary batteries.

A lithium secondary battery using a solid electrolyte is advantageous in that it has enhanced safety, prevents leakage of an electrolyte to improve the reliability of a battery, and facilitates manufacture of a thin battery. In addition, lithium metal may be used as a negative electrode to improve energy density. Thus, such a lithium secondary battery using a solid electrolyte has been expected to be applied to a high-capacity secondary battery for electric vehicles in addition to a compact secondary battery, and has been spotlighted as a next-generation battery.

However, a lithium secondary battery using a solid electrolyte has lower ion conductivity as compared to a battery using a liquid electrolyte and particularly shows degradation of output characteristics at low temperature. In addition, such a solid electrolyte is problematic in that it has a difficulty in forming a uniform contact interface between an electrode and a solid electrolyte membrane, as compared to a liquid electrolyte, and is in poor contact with an electrode active material to cause an increase in resistance. For these reasons, in the case of an electrode using a solid electrolyte, it cannot realize capacity sufficiently as compared to the capacity of an electrode in the presence of a liquid electrolyte, and thus provides capacity lower than the designed or theoretical capacity. In addition, a solid electrolyte membrane is formed to a larger thickness as compared to the separator used as an insulation layer between a positive electrode and a negative electrode in a liquid electrolyte battery, resulting in the problem of degradation of energy density per unit cell.

Under these circumstances, there is a need for improving the interfacial property between an electrode and a solid electrolyte membrane and for thinning a solid electrolyte membrane in order to realize excellent electrochemical characteristics of a solid-state battery.

DISCLOSURE

Technical Problem

The present disclosure is designed to solve the problems of the related art, and therefore the present disclosure is directed to providing a method for manufacturing a solid-state battery which shows excellent interfacial contact property between an electrode and a solid electrolyte and has reduced interfacial resistance. The present disclosure is also directed to providing a solid-state battery obtained by the above-mentioned method. Meanwhile, these and other objects and advantages of the present disclosure may be understood from the following detailed description. Also, it will be easily understood that the objects and advantages of the present disclosure may be realized by the means shown in the appended claims and combinations thereof.

Technical Solution

According to an embodiment of the present disclosure, there is provided a method for manufacturing a solid-state battery, including the steps of: S1) applying slurry for a first solid electrolyte layer to the surface of a first electrode to prepare a first electrode portion having a first electrolyte slurry layer formed on the surface thereof; S2) applying slurry for a second solid electrolyte layer to the surface of a second electrode to prepare a second electrode portion having a second electrolyte slurry layer formed on the surface thereof; S3) binding the first electrode portion with the second electrode portion in such a manner that the electrode slurry layers may face each other; and S4) carrying out drying of the product of step S3), wherein the solid-state battery includes a positive electrode/solid electrolyte layer/negative electrode stacked successively.

According to the second embodiment of the present disclosure, there is provided the method for manufacturing a solid-state battery as defined in the first embodiment, wherein step S3) is carried out, while the slurry is not dried.

According to the third embodiment of the present disclosure, there is provided the method for manufacturing a solid-state battery as defined in the first or the second embodiment, wherein pressurization is carried out before and/or after carrying out step S4).

According to the fourth embodiment of the present disclosure, there is provided the method for manufacturing a solid-state battery as defined in any one of the first to the third embodiments, wherein the slurry for a solid electrolyte layer includes a solid electrolyte, and the solid electrolyte is at least one selected from a polymeric solid electrolyte and an inorganic solid electrolyte.

According to the fifth embodiment of the present disclosure, there is provided the method for manufacturing a solid-state battery as defined in any one of the first to the fourth embodiments, wherein the slurry for a solid electrolyte layer includes a polymeric solid electrolyte as a solid electrolyte.

According to the sixth embodiment of the present disclosure, there is provided the method for manufacturing a solid-state battery as defined in any one of the first to the fifth embodiments, wherein the slurry for a solid electrolyte layer includes an oxide-based solid electrolyte and/or a sulfide-based solid electrolyte as a solid electrolyte and further includes a binder resin together with the solid electrolyte.

According to the seventh embodiment of the present disclosure, there is provided the method for manufacturing a solid-state battery as defined in any one of the first to the sixth embodiments, wherein step S4) is carried out through vacuum drying.

According to the eighth embodiment of the present disclosure, there is provided the method for manufacturing a solid-state battery as defined in any one of the first to the seventh embodiments, wherein the drying is carried out at a temperature of 50-150° C.

According to the ninth embodiment of the present disclosure, there is provided the method for manufacturing a solid-state battery as defined in any one of the first to the eighth embodiments, wherein the polymeric solid electrolyte is a mixture of a solvated lithium salt with a polymer resin, and includes at least one selected from the group consisting of a polyether polymer, polycarbonate polymer, acrylate polymer, polysiloxane polymer, phosphazene polymer, polyethylene derivatives, alkylene oxide derivatives such as polyethylene oxide, phosphate ester polymer, poly-lysine, polyester sulfide, polyvinyl alcohol and polyvinylidene fluoride.

Advantageous Effects

The solid-state battery according to the present disclosure shows excellent interfacial property, such as reduced resistance, by virtue of close contact between the electrode and the solid electrolyte membrane. In addition, it is possible to control the thickness of the solid electrolyte membrane to a level of several microns, and thus to provide an effect of increasing the energy density of a unit cell.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing. Meanwhile, shapes, sizes, scales or proportions of some constitutional elements in the drawings may be exaggerated for the purpose of clearer description.

BEST MODE

Figure 1:
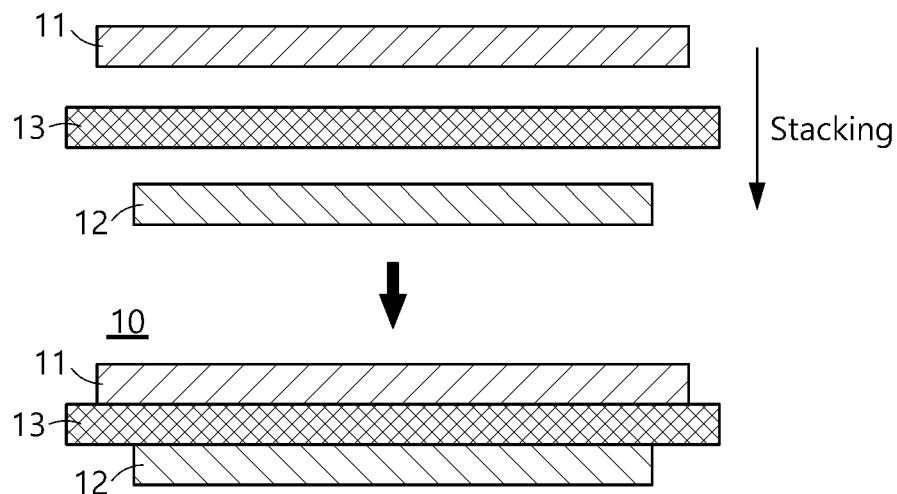
FIG. 1 is a schematic view illustrating the method for manufacturing a solid-state battery according to the related art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part ⌈includes⌋ an element' does not preclude the presence of any additional elements but means that the part may further include the other elements.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively. 'Front', 'rear', 'top' and 'bottom' and related words and expressions show the positions and points in the drawings to which they are referred and should not be limiting. Such terms include the above-listed words, derivatives thereof and words having similar meanings.

The present disclosure relates to a solid-state battery using a solid electrolyte material as an electrolyte. Particularly, the present disclosure relates to a method for manufacturing a solid-state battery designed to improve the interfacial property between an electrode and a solid electrolyte membrane. According to an embodiment of the present disclosure, the solid-state battery uses a solid electrolyte material as an electrolyte and may be a lithium ion secondary battery capable of repeating charge/discharge.

FIG. 1 is a schematic view illustrating the method for manufacturing a secondary battery according to the related art. Referring to FIG. 1, a solid-state battery 10 is generally obtained by separately preparing a first electrode 11, solid electrolyte membrane 13 and a second electrode 12, stacking them successively, and pressurizing them so that the electrodes may be in close contact with the solid electrolyte membrane. The first electrode may be a negative electrode. In this case, there is a problem in that the solid electrolyte membrane is not in close contact with the electrodes but is spaced apart therefrom, thereby frequently generating dead spaces incapable of ion conduction between the electrode and the solid electrolyte membrane, resulting in an increase in resistance and a failure in realizing the designed capacity of the battery. Meanwhile, in order to solve the above-mentioned problem, high pressure is applied or pressurization is carried out at high temperature so that the electrodes and the solid electrolyte membrane may be in close contact uniformly as a whole. However, in this case, such a pressurization and heating process is complicated and requires high energy consumption undesirably.

Figure 2:
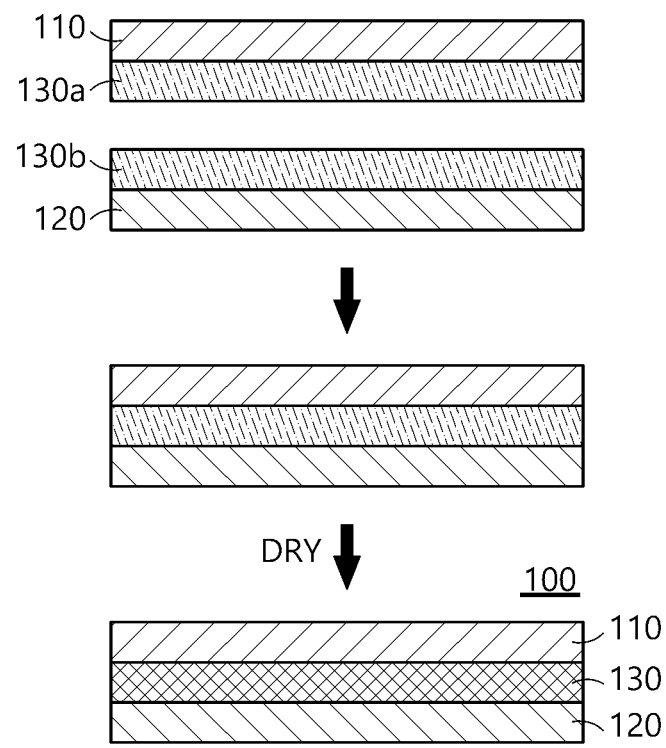
FIG. 2 is a schematic view illustrating the method for manufacturing a battery according to an embodiment of the present disclosure, and the structure of the electrode obtained by the method.

FIG. 2 is a schematic view illustrating the method for manufacturing a battery according to an embodiment of the present disclosure. Hereinafter, the method for manufacturing a battery according to the present disclosure will be explained in more detail with reference to FIG. 2.

First, a first electrode 110 is prepared. The first electrode includes a current collector and an electrode active material layer formed on the surface of the current collector. The electrode active material layer includes an electrode active material and a solid electrolyte, and may further include a conductive material and/or binder resin, if necessary. According to the present disclosure, the electrode may be obtained by mixing the electrode active material layer ingredients, such as the electrode active material and solid electrolyte, in a solvent to prepare electrode slurry, and applying the resultant slurry composition to the current collector, followed by drying. The ingredients contained in the electrode active material layer, such as the electrode active material, will be described hereinafter. The solvent may be at least one solvent selected from water, and organic solvents, such as dimethyl formamide (DMF), N-methyl-2-pyrrolidone (NMP), acetone, dimethyl sulfoxide (DMSO), tetrahydrofuran (THF), acetonitrile (AN), ethanol and hexane. The electrode slurry may be applied through a known process, such as doctor blade coating or slot die coating, and the coating process is not particularly limited, as long as it allows application of the slurry to a predetermined thickness.

Once the electrode slurry is applied to the surface of the current collector to a predetermined thickness, it is dried to remove the solvent therefrom. According to an embodiment of the present disclosure, the drying process is not particularly limited, as long as it can remove the solvent from the slurry, and various processes may be used. For example, the drying process may be selected suitably from natural drying, drying under heating, drying under air blowing, hot air drying, cold air drying, vacuum drying, or the like. According to an embodiment of the present disclosure, a pressing step of pressurizing the surface of the electrode may be further carried out after carrying out the drying step. The pressing step may be carried out by using a known pressurization member, such as a jig or pressing roller, but is not limited thereto. It is possible to control the electrode to have a desired level of thickness and porosity through the pressing step. If necessary, the pressing step may be controlled to a suitable temperature condition, for example, by heating or cooling the electrode.

The porosity (vol %) may be determined by any method with no particular limitation. For example, the porosity may be determined by using the currently used Brunauer-Emmett-Teller (BET) method using an adsorptive gas, such as nitrogen, in the volume of micro- and meso-pores, or by using the currently used Hg intrusion porosimetry. In addition, the porosity of an object to be tested may be calculated from the apparent density and the net density of the ingredients of the object to be tested.

After the first electrode 110 is prepared as described above, slurry 130a for a first solid electrolyte layer is applied to the surface of the first electrode 110 to prepare a first electrode portion. In other words, the first electrode portion includes the first electrolyte slurry layer formed on the surface of the electrode active material layer to a predetermined thickness. The slurry for the first solid electrolyte layer includes a solid electrolyte dissolved or dispersed in a suitable dispersion medium. As described hereinafter, the solid electrolyte may include at least one of a polymeric solid electrolyte, oxide-based solid electrolyte and a sulfide-based solid electrolyte. According to an embodiment of the present disclosure, the slurry for the first solid electrolyte layer and slurry for a second solid electrolyte layer may include a polymeric solid electrolyte. If an oxide-based solid electrolyte and/or sulfide-based solid electrolyte is used as a solid electrolyte, the slurry may further include a polymer resin for a binder in order to maintain the binding of electrolyte particles among themselves and to prevent separation of the electrolyte particles from the solid electrolyte membrane. The slurry for an electrolyte layer may be applied through a known process, such as doctor blade or slot die coating, and the coating process is not particularly limited, as long as it allows application of the slurry to a predetermined thickness.

Next, a second electrode portion is prepared. The second electrode portion may be obtained by the same method as used for preparing the first electrode portion. In other words, the second electrode portion is obtained by applying slurry 130b for the second solid electrolyte layer to the surface of the electrode active material layer of the second electrode 120 to form the second electrolyte slurry layer to a predetermined thickness. According to the present disclosure, the first electrode 110 and the second electrode 120 have the opposite polarity to each other. When the first electrode is a negative electrode, the second electrode is a positive electrode. When the first electrode is a positive electrode, the second electrode is a negative electrode. According to an embodiment of the present disclosure, the first electrode may be a negative electrode. According to the present disclosure, preparation of the first electrode portion and that of the second electrode portion may not be carried out sequentially, but may be carried out at the same time or in reverse order. Meanwhile, according to an embodiment of the present disclosure, the solid electrolyte ingredients contained in the first electrolyte slurry and the second electrolyte slurry may be the same or different.

Then, the first electrode portion and the second electrode portion obtained from the preceding steps are stacked, wherein they are disposed in such a manner that the first electrolyte slurry layer of the first electrode portion may face the second electrolyte slurry layer of the second electrode portion. According to an embodiment of the present disclosure, after preparing the first electrode portion and the second electrode portion, the first electrolyte slurry layer and the second electrolyte slurry layer may be maintained in a non-dried state or may be dried to such a degree that the solvent is not totally removed and the slurry is viscous and non-flowing. Considering the fusion of the first slurry with the second slurry in the following step, the solvent is neither totally removed nor totally dried. According to an embodiment of the present disclosure, it is preferred to make the electrolyte slurry layers become in close contact with each other, while the electrolyte slurry layers are not totally dried, i.e. the solvent remains in the slurry.

After that, the product obtained by stacking the first electrode portion and the second electrode portion is pressurized so that the first electrolyte slurry layer may be in close contact with the second electrolyte slurry layer. Herein, the first electrode 110 and the first electrolyte slurry 130a may be in closer contact with each other, and the second electrode 120 and the second electrolyte slurry 130b may be in closer contact with each other. In addition, the first electrolyte slurry and the second electrolyte slurry are fused with each other and bound integrally to each other in such a degree that the adhesion interface may not be distinguished. Thus, both electrode portions are bound to each other, while each electrolyte slurry is not totally dried, and thus each electrode may be in good contact with each electrolyte slurry even under low pressure. In addition, while pressurizing the product, heating may be skipped. The pressurization process is not particularly limited. For example, a known pressurization process, for example, using a hot press, roll press, jig, or the like, may be selected suitably to carry out the pressurization process. If necessary, the pressurization may be controlled to a suitable temperature condition, for example, by heating or cooling. After the pressurization, the first electrode portion is stacked with the second electrode portion in such a manner that the electrolyte slurry layers may face each other, thereby providing a stack in which the first and the second electrolyte slurry layers are bound integrally to each other. In the stack, the first and the second electrolyte slurry layers are bound integrally to each other. Thus, the resultant product functions as a solid electrolyte membrane 130 as described hereinafter.

Then, the stack may be dried to obtain an electrode assembly. According to an embodiment of the present disclosure, the drying process is not particularly limited, as long as it can remove the solvent from the slurry, and various processes may be used. For example, the drying process may be selected suitably from natural drying, drying under heating, drying under air blowing, hot air drying, cold air drying, vacuum drying, or the like. According to an embodiment of the present disclosure, it is preferred to carry out the drying process through vacuum drying. The drying temperature may be determined depending on electrode materials to be used. For example, when lithium metal is used as a negative electrode active material, it is possible to control the drying temperature to 60° C. or lower in order to prevent oxidation of lithium metal. When graphite or lithium titanium oxide is used as a negative electrode active material, a higher drying temperature may be used. According to an embodiment of the present disclosure, the drying process may be carried out for 12 hours or more.

The electrode assembly obtained by the above-described method includes the first electrode, solid electrolyte membrane and the second electrode, stacked successively, wherein the solid electrolyte membrane is the above-mentioned product including the first electrolyte slurry layer and the second electrolyte slurry layer bound integrally to each other. The electrode assembly shows improved adhesion between each electrode and the solid electrolyte membrane, thereby reducing spacing between the electrode and the solid electrolyte membrane and providing improved interfacial property. After that, the electrode assembly may be introduced to a suitable casing, such as a metallic can or pouch, and then sealed to obtain a solid-state battery.

In another aspect of the present disclosure, there is provided an electrode assembly obtained by the above-described method. The electrode assembly includes two electrodes having the opposite polarity to each other and a solid electrolyte membrane interposed between both electrodes. For example, the electrode assembly may include a negative electrode/solid electrolyte membrane/positive electrode, stacked successively.

Each electrode may include a current collector and an electrode active material layer formed on at least one surface of the current collector, wherein the electrode active material layer may include a plurality of electrode active material particles and a solid electrolyte. In addition, the electrode active material layer may further include at least one of a conductive material and a binder resin, if necessary. Additionally, the electrode active material layer may further include various additives in order to supplement or improve the physicochemical properties of the electrode. Meanwhile, when the electrode is a negative electrode and lithium metal is used as the negative electrode, the electrode may not include a current collector and/or solid electrolyte.

According to the present disclosure, when the electrode is a negative electrode, the electrode active material may be any material used conventionally as a negative electrode active material for a lithium ion secondary battery. For example, the negative electrode active material may include at least one selected from: carbon such as non-graphitizable carbon, graphitic carbon, or the like; metal composite oxides such as $Li_xFe_2O_3$ (0≤x≤1), $Li_xWO_2$ (0≤x≤1), $Sn_xMe_{1-x}Me'_yO_z$ (Me: Mn, Fe, Pb or Ge; Me': Al, B, P, Si, an element of Group 1, Group 2 or Group 3 in the Periodic Table, or halogen; 0<x≤1; 1≤y≤3; 1≤z≤8); lithium metal; lithium alloys; silicon-based alloys; tin-based alloys; metal oxides such as SnO, $SnO_2$, PbO, $PbO_3$, $Pb_3O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, or the like; conductive polymers such as polyacetylene; Li—Co—Ni based materials; titanium oxide; and lithium titanium oxide, or the like. According to an embodiment of the present disclosure, the negative electrode active material may include a carbonaceous material and/or Si.

When the electrode is a positive electrode, the electrode active material may be any material used conventionally as a positive electrode active material for a lithium ion secondary battery. Non-limiting examples of the positive electrode active material may include, but are not limited to: layered compounds such as lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M=Co, Ni, Fe, Cr, Zn or Ta, and x=0.01-0.1) or $Li_2Mn_3MO_8$ (wherein M=Fe, Co, Ni, Cu or Zn); lithium manganese composite oxides having a spinel structure and represented by the formula of $LiNi_xMn_{2-x}O_4$; $LiMn_2O_4$ in which Li is partially substituted with an alkaline earth metal ion; disulfide compounds; $Fe_2(MoO_4)_3$; or the like.

According to an embodiment of the present disclosure, the current collector includes a metal plate having electrical conductivity and may be one selected suitably depending on polarity of electrodes known in the field of secondary batteries.

According to an embodiment of the present disclosure, the electrode active material layer may include the conductive material in an amount of 1-30 wt % based on 100 wt % of the electrode active material layer. The conductive material is not particularly limited, as long as it causes no chemical change in the corresponding battery and has conductivity. For example, the conductive material include any one selected from: graphite, such as natural graphite or artificial graphite; carbon black, such as carbon black, acetylene black, KETJENBLACK®, channel black, furnace black, lamp black or thermal black; conductive fibers, such as carbon fibers or metallic fibers; metal powder, such as carbon fluoride, aluminum or nickel powder; conductive whisker, such as zinc oxide or potassium titanate; conductive metal oxide, such as titanium oxide; and conductive materials, such as polyphenylene derivatives, or a mixture of two or more of them.

According to an embodiment of the present disclosure, the binder resin is not particularly limited, as long as it is an ingredient which assists binding of the ingredients of the electrode, such as the electrode active material or solid electrolyte, and binding of the ingredients to the current collector. Particular examples of the binder resin include polyvinylidene fluoride, polyvinyl alcohol, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene terpolymer (EPDM), sulfonated EPDM, styrene butyrene rubber, fluororubber, various copolymers, or the like. In general, the binder resin may be used in an amount of 1-30 wt %, or 1-10 wt %, based on 100 wt % of electrode active material layer.

Although there is no particular limitation in the additives, the additives may include at least one of an oxidation stabilizing additive, reduction stabilizing additive, flame retardant, heat stabilizer, anti-fogging agent, or the like.

According to an embodiment of the present disclosure, the solid electrolyte may further include, as an ingredient contained in the electrode and the solid electrolyte membrane, at least one of a polymeric solid electrolyte, oxide-based solid electrolyte and a sulfide-based solid electrolyte.

According to an embodiment of the present disclosure, different solid electrolytes may be used for the positive electrode, negative electrode and the solid electrolyte membrane. In a variant, the same solid electrolyte may be used for at least two battery elements. For example, in the case of a positive electrode, a polymeric electrolyte having excellent oxidation stability may be used as a solid electrolyte. In addition, in the case of a negative electrode, a polymeric electrolyte having excellent reduction stability is used preferably as a solid electrolyte. However, the scope of the present disclosure is not limited thereto. Since the solid electrolyte mainly functions to transport lithium ions in the electrode, any material having a high ion conductivity, such as $10^{-6}$ s/cm or more, may be used with no particular limitation.

According to an embodiment of the present disclosure, the polymeric solid electrolyte may be a solid polymer electrolyte formed by adding a polymer resin to a lithium salt, wherein the polymer resin and lithium salt are solvated independently from each other. In a variant, the polymeric solid electrolyte may be a polymer gel electrolyte formed by impregnating a polymer resin with an organic electrolyte containing an organic solvent and a lithium salt.

According to an embodiment of the present disclosure, the solid polymer electrolyte is an ion conductive material, and any polymeric material used currently as a solid electrolyte ingredient for a solid-state battery may be used with no particular limitation. For example, the solid polymer electrolyte may include a polyether polymer, polycarbonate polymer, acrylate polymer, polysiloxane polymer, phosphazene polymer, polyethylene derivative, alkylene oxide derivative, such as polyethylene oxide, phosphate ester polymer, poly-lysine, polyester sulfide, polyvinyl alcohol, polyvinylidene fluoride, polymer containing an ionically dissociable group, or the like. According to an embodiment of the present disclosure, the solid polymer electrolyte may include, as a polymer resin, a branched copolymer including polyethylene oxide (PEO) backbone copolymerized with a comonomer including an amorphous polymer, such as PMMA, polycarbonate, polydiloxane (pdms) and/or phosphazene, comb-like polymer, crosslinked polymer resin, or the like.

According to an embodiment of the present disclosure, the polymer gel electrolyte includes a lithium salt-containing organic electrolyte and a polymer resin, wherein the organic electrolyte is used in an amount of 60-400 parts by weight based on the weight of the polymer resin. The polymer applied to a gel electrolyte is not particularly limited, but particular examples thereof may include PVC, PMMA, polyacrylonitrile (PAN), polyvinylidene fluoride (PVdF), polyvinylidene fluoride-hexafluoropropylene (PVdF-HFP), or the like.

In the electrolyte according to the present disclosure, the lithium salt is an ionizable lithium salt and may be represented by $Li^+X^-$. The anion ($X^-$) of the lithium salt is not particularly limited, but may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, or the like.

The sulfide-based solid electrolyte contains sulfur (S), has conductivity of metal ions that belong to Group 1 or Group 2 in the Periodic Table, and may include Li—P—S glass or Li—P—S glass ceramic. Non-limiting examples of the sulfide-based solid electrolyte include at least one of $Li_2S$—$P_2S_5$, $Li_2S$—LiI—$P_2S_5$, $Li_2S$—LiI—$Li_2O$—$P_2S_5$, $Li_2S$—LiBr—$P_2S_5$, $Li_2S$—$Li_2O$—$P_2S_5$, $Li_2S$—$Li_3PO_4$—$P_2S_5$, $Li_2S$—$P_2S_5$—$P_2O_5$, $Li_2S$—$P_2S_5$—$SiS_2$, $Li_2S$—$P_2S_5$—$SnS$, $Li_2S$—$P_2S_5$—$Al_2S_3$, $Li_2S$—$GeS_2$, $Li_2S$—$GeS_2$—$ZnS$, or the like.

In addition, the oxide-based solid electrolyte contains oxygen (O), has conductivity of metal ions that belong to Group 1 or Group 2 in the Periodic Table. Non-limiting examples of the oxide-based solid electrolyte include at least one of LLTO compounds, $Li_6La_2CaTa_2O_{12}$, $Li_6La_2ANb_2O_{12}$ (wherein A is Ca or Sr), $Li_2Nd_3TeSbO_{12}$, $Li_3BO_{2.5}N_{0.5}$, $Li_9SiAlO_8$, LAGP compounds, LATP compounds, $Li_{1+x}Ti_{2-x}Al_xSi_y(PO_4)_{3-y}$ (wherein $0 \leq x \leq 1$, $0 \leq y \leq 1$), $LiAl_xZr_{2-x}(PO_4)_3$ (wherein $0 \leq x \leq 1$, $0 \leq y \leq 1$), $LiTi_xZr_{2-x}(PO_4)_3$ (wherein $0 \leq x \leq 1$, $0 \leq y \leq 1$), LISICON compounds, LIPON compounds, perovskite compounds, NASICON compounds and LLZO compounds.

According to an embodiment of the present disclosure, the solvent used for preparing the first slurry and the second slurry may be selected suitably depending on solid electrolyte to be used with no particular limitation. Particular examples of the solvent include at least one selected from water, and organic solvents, such as dimethyl formamide (DMF), N-methyl-2-pyrrolidone (NMP), acetone, dimethyl sulfoxide (DMSO), tetrahydrofuran (THF), acetonitrile (AN), ethanol and hexane.

In another aspect of the present disclosure, there are provided an electrode assembly obtained by the above-described method, and a secondary battery including the same. In the electrode assembly, the solid electrolyte membrane and the electrode is in close contact with each other, and thus it is possible to maintain low interfacial resistance and to improve battery performance, including output characteristics and ion conductivity. In addition, since pressurization is carried out in a non-dried slurry state, it is possible to control the thickness of electrode assembly easily without any damage upon the solid electrolyte membrane, and to accomplish thinning of the solid electrolyte membrane to a thickness of several microns. By virtue of the above characteristics, it is possible to increase the energy density of a unit cell.

In still another aspect, there are provided a battery module including the secondary battery as a unit cell, a battery pack including the battery module, and a device including the battery pack as a power source. Herein, particular examples of the device may include, but are not limited to: power tools driven by an electric motor; electric cars, including electric vehicles (EV), hybrid electric vehicles (HEV), plug-in hybrid electric vehicles (PHEV), or the like; electric carts, including electric bikes (E-bikes) and electric scooters (E-scooters); electric golf carts; electric power storage systems; or the like.

Examples will be described more fully hereinafter so that the present disclosure can be understood with ease. However, the following examples are for illustrative purposes only and the scope of the present disclosure is not limited thereto.

EXAMPLES

Example 1

(1) Manufacture of First Electrode Portion

First, NCM811 ($LiNi_{0.8}Co_{0.1}Mn_{0.1}O_2$), vapor grown carbon fibers (VGCF), and a polymeric electrolyte (polyethylene oxide (PEO)+LiFSI (($LiCF_3SO_2)_2N$), molar ratio of [EO]:[$Li^+$]=8:1) were mixed at a weight ratio of 82.7:3:14.3 and the resultant mixture was introduced to acetonitrile, followed by agitation, to provide positive electrode slurry. An aluminum current collector having a thickness of 20 μm was prepared. The positive electrode slurry was applied to the current collector and the resultant product was vacuum-dried at 80° C. for 12 hours. Then, pressing was carried out to obtain a positive electrode having an electrode loading amount (loading amount per electrode area) of 2.3 mAh/cm², an electrode layer thickness of 60 μm and a porosity of 11 vol %. After that, a polymeric electrolyte (PEO+LiFSI, molar ratio 18:1) was mixed with acetonitrile to a concentration of 15 wt %. The resultant slurry was applied to the surface of the positive electrode obtained as described above to provide a first electrode portion.

(2) Manufacture of Second Electrode Portion

Lithium metal having a thickness of 20 μm was prepared as a negative electrode. Next, a polymeric electrolyte (PEO+LiFSI, molar ratio 18:1) was mixed with acetonitrile to a concentration of 15 wt %. The resultant slurry was applied to the surface of the negative electrode prepared as described above to provide a second electrode portion.

(3) Manufacture of Electrode Assembly

The first and the second electrode portions were allowed to face each other and attached to each other to prepare a structure in which a positive electrode/solid electrolyte/negative electrode were formed integrally. Then, a weight of 3 kg was loaded on the structure to pressurize the structure so that the structural elements might be in close contact with one another. While maintaining the above-mentioned state, the structure was vacuum-dried at a temperature of 60° C. for about 12 hours.

(4) Manufacture of Coin-Cell

The electrode assembly was cut into an area of 1.76 cm² to obtain a 2032 type coin-cell.

Example 2

An electrode assembly and a coin-cell were obtained in the same manner as Example 1, except that lithium cobalt oxide ($LiCoO_2$) was used as an electrode active material for manufacturing the first electrode, instead of NCM811 ($LiNi_{0.8}Co_{0.1}Mn_{0.1}O_2$).

Comparative Example 1

(1) Preparation of Positive Electrode

First, NCM811 ($LiNi_{0.8}Co_{0.1}Mn_{0.1}O_2$), VGCF, and a polymeric electrolyte (PEO+LiFSI, molar ratio of [EO]:[$Li^+$]=8:1) were mixed at a weight ratio of 82.7:3:14.3 and the resultant mixture was introduced to acetonitrile, followed by agitation, to provide positive electrode slurry. An aluminum current collector having a thickness of 20 μm was prepared. The positive electrode slurry was applied to the current collector and the resultant product was vacuum-dried at 80° C. for 12 hours. Then, pressing was carried out to obtain a positive electrode having an electrode loading amount (loading amount per electrode area) of 2.3 mAh/cm², an electrode layer thickness of 60 μm and a porosity of 11 vol %.

(2) Preparation of Negative Electrode

Lithium metal having a thickness of 20 μm was prepared as a negative electrode.

(3) Preparation of Solid Electrolyte Membrane

Polyethylene oxide (PEO, $M_w$=4,000,000 g/mol) was dissolved in acetonitrile (AN) as a solvent to prepare a polymer solution having a concentration of 15 wt %. Herein, LiTFSI was also introduced thereto to a molar ratio of [EO]/[$Li^+$]=8:1. The prepared polymer solution was agitated overnight at 70° C. so that PEO and the salt might be dissolved sufficiently therein. Meanwhile, an additive solution containing a curing agent and an initiator was agitated for about 1 hour, and was added to the polymer solution. Herein, the curing agent was PEGDA ($M_w$=575) and the initiator was BPO, wherein PEGDA was used at 20 wt % based on PEO, and BPO was used at 1 wt % based on PEGDA. Then, the polymer solution was coated onto a release film through doctor blade coating. The coating process was controlled to a gap of 800 μm and a rate of 20 mm/min. The coated polymer solution was transferred to a glass plate together with the release film, maintained its level, allowed to stand in a chamber at room temperature overnight, and then vacuum-dried at 100° C. for 12 hours. A solid electrolyte membrane having a thickness of 40 μm was obtained.

(4) Manufacture of Electrode Assembly

The positive electrode, negative electrode and the solid electrolyte membrane prepared as described above were cut into an adequate size. The positive electrode was cut into a size of 1.4875 cm², the solid electrolyte membrane was cut into 2.835 cm², and the negative electrode was cut into 1.7671 cm². Next, the negative electrode was stacked with the electrolyte membrane and the first lamination was carried out. Then, the resultant product was stacked with the positive electrode and the second lamination was carried out so that the solid electrolyte membrane might be interposed between the positive electrode and the negative electrode. Upon the first and the second lamination, a release sheet was interposed between the laminator and each stack to prevent the stack from being damaged. In this manner, an electrode assembly including a stack of positive electrode/electrolyte membrane/negative electrode was obtained. Then, the electrode assembly was introduced to a casing in a glove box under inert atmosphere to obtain a coin-cell. The coin-cell was allowed to stand at 60° C. for 12 hours.

Comparative Example 2

An electrode assembly and a coin-cell were obtained in the same manner as Comparative Example 1, except that lithium cobalt oxide (LiCoO$_2$) was used as an electrode active material for manufacturing the positive electrode, instead of NCM811 (LiNi$_{0.8}$Co$_{0.1}$Mn$_{0.1}$O$_2$).

Test Example 1. Evaluation of Initial Charge/Discharge Profile (1)

Figure 3:
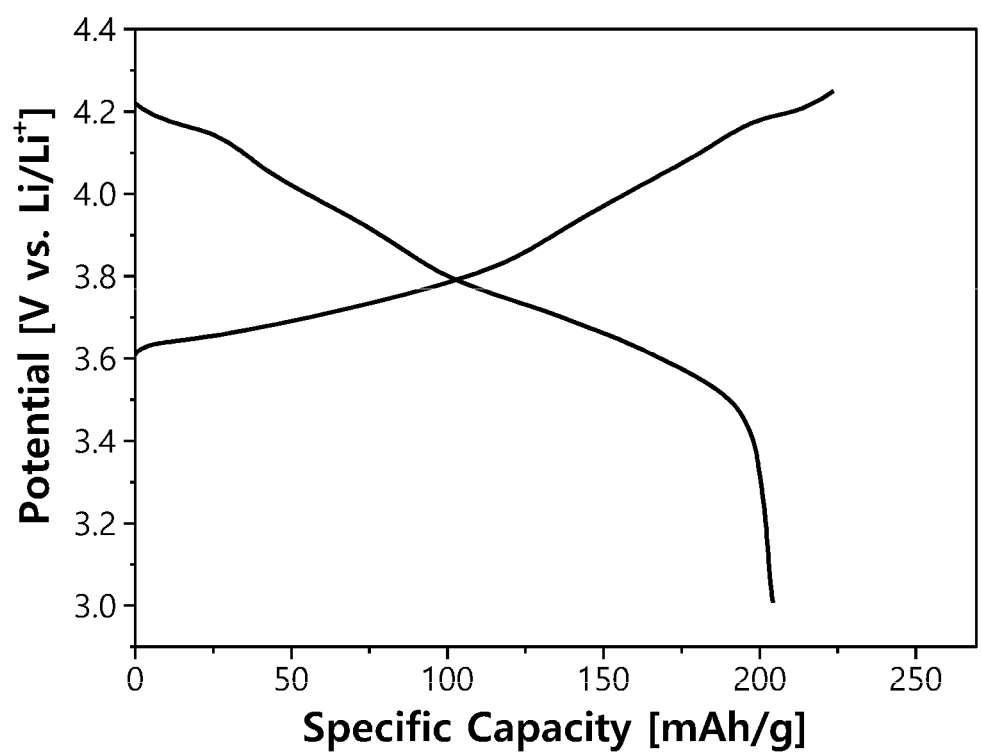
FIG. 3 and FIG. 4 show the initial charge/discharge profile curves of the solid-state batteries obtained from Example 1 according to the present disclosure and Comparative Example 1.
Figure 4:
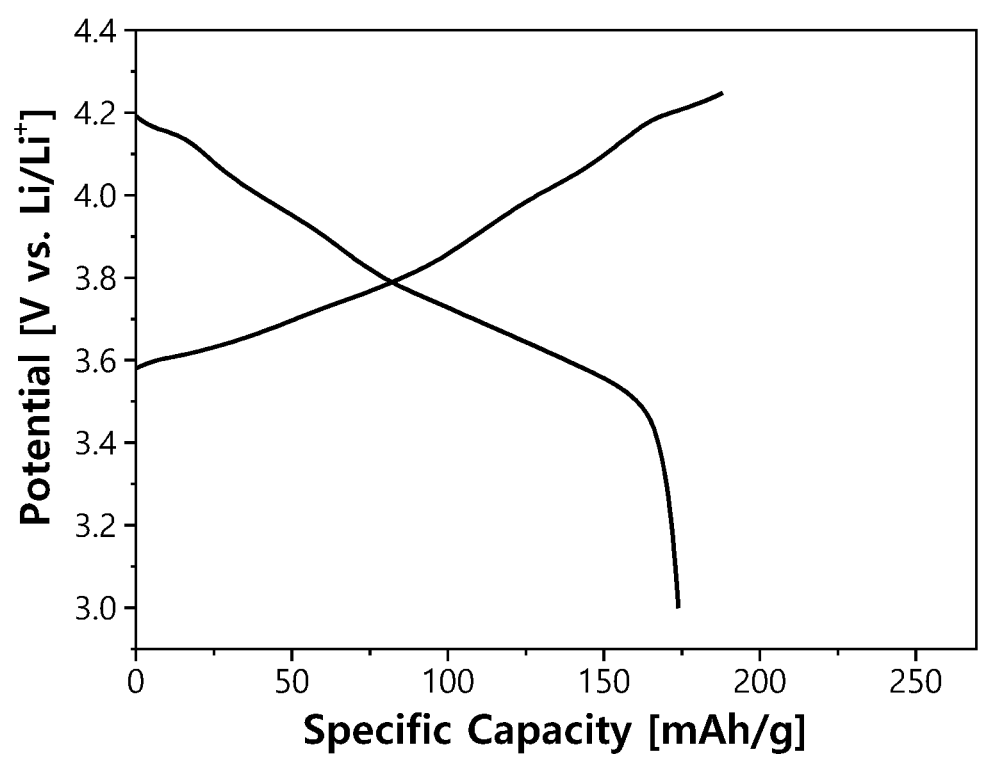

Each of the batteries according to Example 1 and Comparative Example 1 was charged to 4.25V under a constant current (CC) condition at 0.05C, and discharged to 3.0V under a CC condition at 0.05C (C-rate) to carry out the first charge/discharge cycle. FIG. 3 is a graph illustrating the first charge/discharge profile of the battery according to Example 1, and FIG. 4 is a graph illustrating the first charge/discharge profile of the battery according to Comparative Example 1. After the test, the battery according to Example 1 shows an initial discharge capacity higher than 200 mAh/g and an initial charge/discharge efficiency of about 92%. On the contrary, the battery according to Comparative Example 1 shows an initial charge/discharge efficiency of 92%, which is similar to the efficiency of the battery according to Example 1. However, the battery according to Comparative Example 1 shows a low initial discharge capacity of about 174 mAh/g.

Test Example 2. Evaluation of Initial Charge/Discharge Profile (2)

Figure 7:
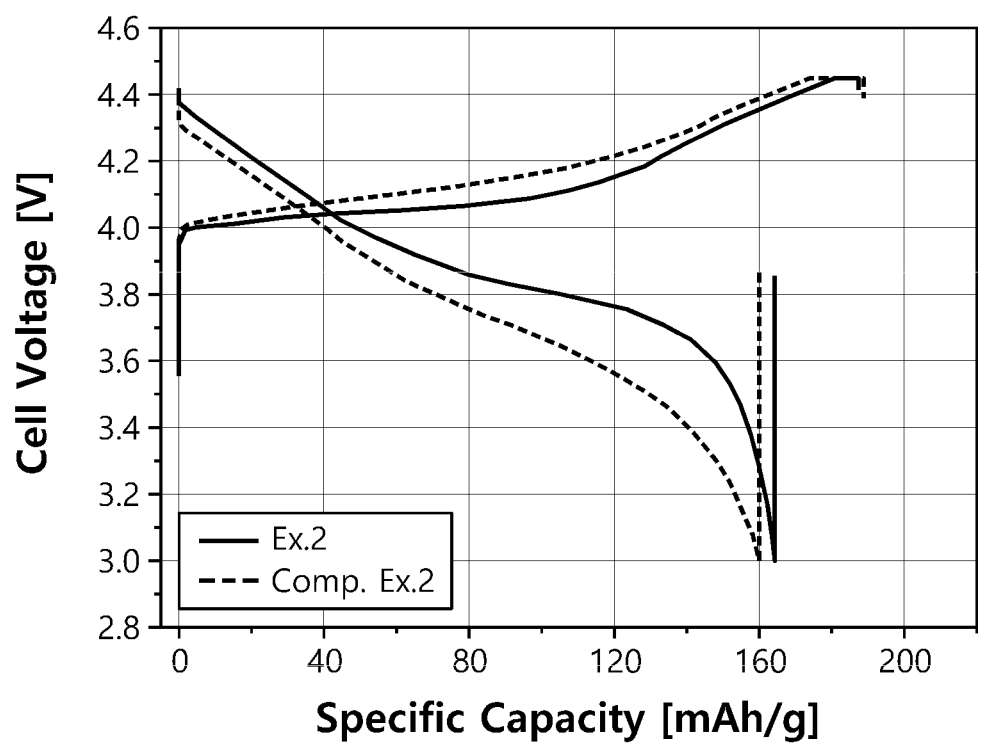
FIG. 7 shows the initial charge/discharge profile curves of the solid-state batteries obtained from Example 2 according to the present disclosure and Comparative Example 2.

Each of the batteries according to Example 2 and Comparative Example 2 was charged to 4.45V under a constant current-constant voltage (CC-CV) condition at a rate of 0.05C (cut off 0.02C), and discharged to 3.0V under a CC condition to carry out the first charge/discharge cycle. FIG. 7 is a graph illustrating the first charge/discharge profile of each of the batteries according to Example 2 and Comparative Example 2. After the test, the battery according to Example 2 shows a higher initial discharge capacity as compared to the battery according to Comparative Example 2. In addition, upon discharge, the battery according to Example 2 shows a longer plateau, as compared to the battery according to Comparative Example 2.

Test Example 3. Evaluation of Rate Characteristics

Figure 5:
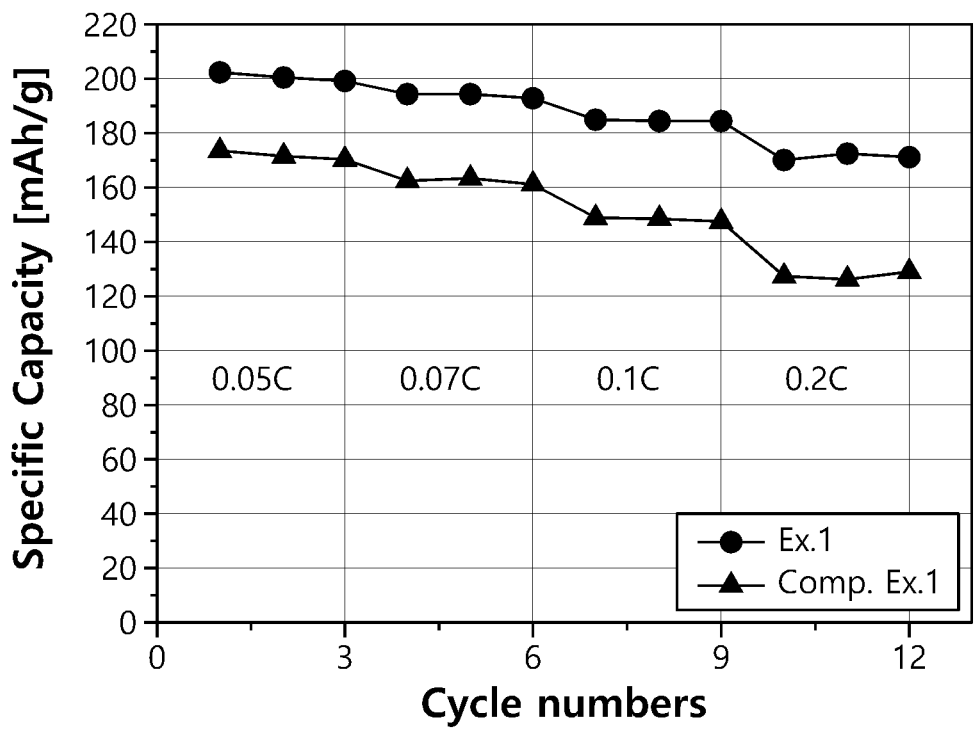
FIG. 5 shows the results of rate characteristics of the batteries obtained from Example 1 according to the present disclosure and Comparative Example 1.

Each of the batteries according to Example 1 and Comparative Example 1 was charged to 4.25V under a CC condition at 0.05C and discharged to 3V. The charge/discharge cycle was repeated 12 times. Herein, the battery was discharged while increasing C rate at an interval of 3 cycles. FIG. 5 is a graph illustrating the test results of rate characteristics of each of the batteries according to Example 1 and Comparative Example 1. As can be seen from FIG. 5, the battery according to Example 1 shows higher rate characteristics at each C-rate, as compared to the battery according to Comparative Example 1. Particularly, in the case of high-rate discharge at 0.2C, the battery according to Comparative Example 1 shows a significant decrease in capacity. It can be seen that the battery according to Example 1 retains its capacity well, as compared to the battery according to Comparative Example 1.

Test Example 4. Evaluation of Life Characteristics

Figure 6:
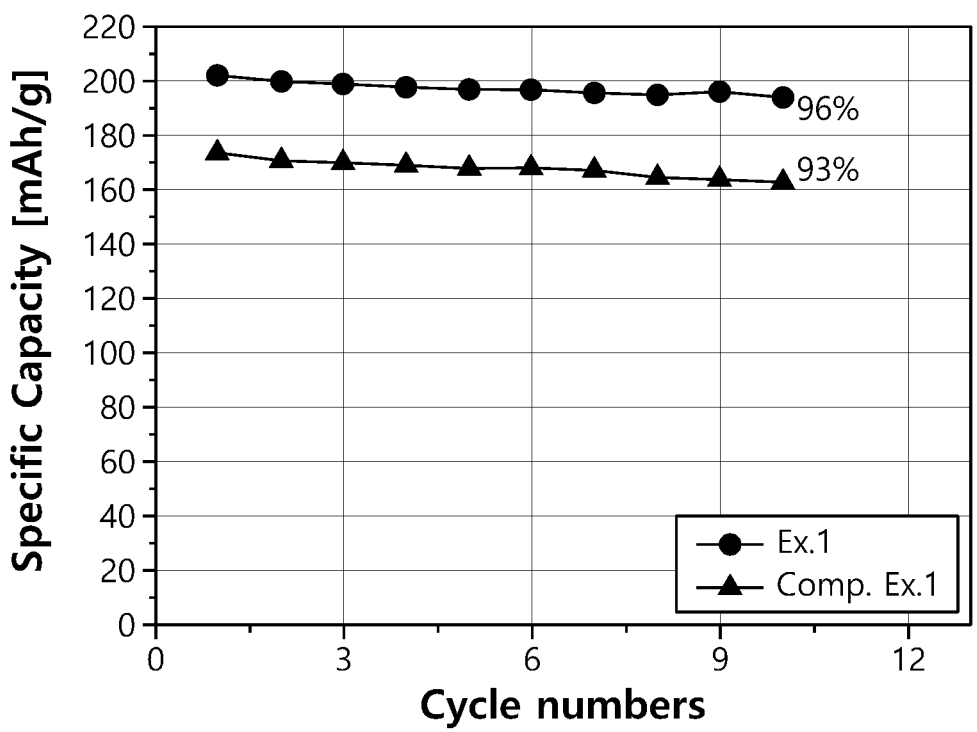
FIG. 6 shows the results of life characteristics of the batteries obtained from Example 1 according to the present disclosure and Comparative Example 1.

Each of the batteries according to Example 1 and Comparative Example 1 was charged to 4.25V under a CC condition at 0.05C and discharged to 3V under a CC condition at 0.5C. The charge/discharge cycle was repeated 10 times. FIG. 6 is a graph illustrating the test results of life characteristics of the batteries. As can be seen from FIG. 6, the battery according to Example 1 retains about 96% of capacity after 10 cycles as compared to the first cycle. On the contrary, the battery according to Comparative Example 1 shows a capacity retention of 93%. In addition, in terms of specific capacity as well as capacity retention, the battery according to Example 1 shows a higher specific capacity as compared to the battery according to Comparative Example 1.

DESCRIPTION OF DRAWING NUMERALS 11, 110: Negative electrode
12, 120: Positive electrode
13, 130: Solid electrolyte membrane
10, 100: Solid-state battery
130$a$: Slurry for the first solid electrolyte layer
130$b$: Slurry for the second solid electrolyte layer

What is claimed is:

1. A method for manufacturing a solid-state battery, comprising the steps of:
    S1) applying a first electrolyte slurry to a surface of a first electrode to prepare a first electrode portion having a first electrolyte slurry layer formed on the surface thereof;
    S2) applying a second electrolyte slurry to a surface of a second electrode to prepare a second electrode portion having a second electrolyte slurry layer formed on the surface thereof;
    S3) binding the first electrode portion with the second electrode portion in such a manner that the first electrolyte slurry layer and the second electrolyte slurry layer face each other to obtain a product; and
    S4) carrying out drying of the product of step S3),
    wherein the solid-state battery comprises a positive electrode/solid electrolyte layer/negative electrode stacked successively, and
    wherein step S3) is carried out immediately after steps S1) and S2) while maintaining the first electrolyte slurry and the second electrolyte slurry in a non-dried slurry state, and
    wherein the first electrode and the second electrode are dried, and then pressed before applying the first electrolyte slurry and the second electrolyte slurry, respectively.

2. The method for manufacturing a solid-state battery according to claim 1, wherein the first electrolyte slurry and the second electrolyte slurry each comprise a solid electrolyte, and the solid electrolyte is at least one selected from a polymeric solid electrolyte or an inorganic solid electrolyte.

3. The method for manufacturing a solid-state battery according to claim 1, wherein the first electrolyte slurry and the second electrolyte slurry each comprise an oxide-based solid electrolyte and/or a sulfide-based solid electrolyte as a solid electrolyte, and further comprises a binder resin together with the solid electrolyte.

4. The method for manufacturing a solid-state battery according to claim 1, wherein the first electrolyte slurry and the second electrolyte slurry each consist of a polymeric solid electrolyte as a solid electrolyte and a solvent.

5. The method for manufacturing a solid-state battery according to claim 1, wherein step S4) is carried out through vacuum drying.

6. The method for manufacturing a solid-state battery according to claim 5, wherein the vacuum drying is carried out at a temperature of 50-150° C.

7. The method for manufacturing a solid-state battery according to claim 1, wherein the first electrode comprises a current collector and an electrode active material layer formed on the surface of the current collector.

8. The method for manufacturing a solid-state battery according to claim 7, wherein the electrode active material layer comprises an electrode active material and a solid electrolyte.

9. The method for manufacturing a solid-state battery according to claim 1, wherein the first electrolyte slurry and the second electrolyte slurry each comprise a polymeric solid electrolyte as a solid electrolyte.

10. The method for manufacturing a solid-state battery according to claim 9, wherein the polymeric solid electrolyte is a mixture of a solvated lithium salt and a polymer resin, and the polymer resin comprises at least one of a polyether polymer, polycarbonate polymer, acrylate polymer, polysiloxane polymer, phosphazene polymer, polyethylene derivatives, alkylene oxide derivatives, phosphate ester polymer, poly-lysine, polyester sulfide, polyvinyl alcohol or polyvinylidene fluoride.

11. The method for manufacturing a solid-state battery according to claim 9, wherein the polymeric solid electrolyte is a mixture of a solvated lithium salt and a polymer resin, and the polymer resin comprises at least one of phosphate ester polymer, poly-lysine, or polyester sulfide.

* * * * *